United States Patent [19]

Wood et al.

[11] 4,390,981
[45] Jun. 28, 1983

[54] MICROPROCESSOR CONTROLLED MESSAGE HANDLING SYSTEM

[75] Inventors: Leonard J. Wood, San Mateo; Balakrishna Parasuraman; Edwin H. Williams, both of Sunnyvale; Mark G. Alexander, Mountain View; Richard C. Montgomery, Jr., Santa Clara, all of Calif.

[73] Assignee: Syscom, Inc., Sunnyvale, Calif.

[21] Appl. No.: 220,375

[22] Filed: Dec. 29, 1980

[51] Int. Cl.³ .............................................. H04J 3/04
[52] U.S. Cl. ...................................... 370/56; 370/41; 370/61
[58] Field of Search ....................... 370/41, 42, 56, 61, 370/85, 62, 109; 178/2 R, 2 C, 3; 179/18 ES, 27 R, 27 A, 27 C

[56] References Cited

U.S. PATENT DOCUMENTS

| | | | |
|---|---|---|---|
| 3,714,377 | 1/1973 | Moretti | 370/61 |
| 3,749,841 | 7/1973 | Cohen et al. | 370/41 |
| 3,922,497 | 11/1975 | Artom et al. | 370/61 |
| 4,232,386 | 11/1980 | McDonald et al. | 370/56 |
| 4,262,171 | 4/1981 | Schneider et al. | 370/30 |
| 4,263,670 | 4/1981 | Sherman | 375/9 |
| 4,330,847 | 5/1982 | Kuseski | 370/61 |

Primary Examiner—Benedict V. Safourek
Attorney, Agent, or Firm—Harry M. Weiss

[57] ABSTRACT

A message handling system includes a computer controlled message processor for use in network configurations to store and forward low-speed messages between long distance and international communicators. Its use is based on dial-up connections between network nodes. Each message handler unit includes a microprocessor, program and buffer storage memories, line multiplexing circuitry, modems and input/output peripheral devices. The message handler unit may comprise a 32 port system, 30 of which are used as input ports and two of which are used as high-speed output ports. A journal of all message numbers is maintained on a printer for complete message accountability.

22 Claims, 10 Drawing Figures

MICROPROCESSOR CONTROLLED MESSAGE HANDLING SYSTEM

BACKGROUND OF THE INVENTION

1. Field of the Invention:

This invention relates generally to a message handling computer system, and more particularly, to a store-and-forward message concentrator and switch for low-speed message communications where instantaneous connections and conversational modes are not required.

2. Description of the Prior Art:

Prior art message handling systems are bulky, slow, and unreliable and consume a lot of power. Further, prior art systems do not generally provide all types of message service i.e. DDD and Telex and TWX.

SUMMARY OF THE INVENTION

It is an object of the present invention to provide a message handling unit which may be used as a message concentrator in a dial-up network environment, or in a dedicated private network using units interconnected through leased lines. This feature would allow low-speed terminal users access to domestic and overseas telex networks via dial-up facilities. Subscribers with telex, TWX or direct-distance-dialling (DDD) types of terminals may be serviced. The concentrator can accomodate traffic from dissimilar terminals comprised of dissimilar information over dissimilar public message networks.

It is a further object of the present invention to provide a store-and-forward message transmission system utilizing a computer to control the flow of traffic which is directed through network nodes, the capacities of which are determined by the number of message handler units installed.

It is a still further object of the invention to provide a message handler unit which is modular in structure so as to accomodate growing traffic volumes, and which consists primarily of integrated circuits and fewer discrete circuits. This may be accomplished by adding more units in increments if 32 ports. Where multiple message handlers are installed to accomodate large networks, the modular structure reduces the degree of service degradation in the event of hardware or other equipment failure. In such cases, the only noticeable effect would be reduced line capacity. Users will still be able to gain access to other message handler units at that location but may have to indure some delay if too many calls are being simultaneously made to the reduced capacity system.

Yet another object of the present invention is to provide a message handling system which includes human operator interaction capabilities. This may be accomplished by means of a command console which is used, for example, to set up line configurations and line parameters, to enter invalid answerback lists, to interrogate system status and for other console related functions.

It is still another object of the present invention to provide a message handling system which provides complete message accountability. This may be accomplished, for example, by keeping a continuous journal of all message numbers on a printer.

Finally, it is an object of the present invention to provide a message handling system which can accomodate both international and domestic message traffic.

According to a broad aspect of the invention there is provided a computer controlled message handling system for use in a dial-up environment and for transmitting messages to and receiving message from existing telex, TWX and DDD terminals, comprising a central processing unit, a system data bus, first memory means coupled to said data bus for storing system operating programs, second memory means coupled to said data bus for storing said messages, multichannel multiplexing means coupled between said data bus and said telex terminals, and modular-demodulator means coupled between said multiplexing means and said TWX and DDD terminals.

According to a further aspect of the invention, there is provided a dial-up communication system for transmitting and receiving data over telex, TWX and DDD lines, comprising first and second message handling units, a communication line coupling said first and second message handling units together, and a plurality of low-speed communication terminals coupled to each of said message handling units for communication therewith, each of said message handling units comprising, a central processing unit, a system data bus, first memory means coupled to said data bus for storing system operating programs, second memory means coupled to said data bus for storing said messages, multi-channel multiplexing means coupled between said data bus and said telex terminals, and modulator-demodulator means coupled between said multiplexing means and said TWX and DDD terminals.

According to a still further aspect of the invention, there is provided a method of communicating between first and second pluralities of low-speed terminals, comprising: transmitting a first plurality of messages from said first plurality of low-speed terminals to a first microprocessor controlled message handling unit for storage therein;

transmitting the stored first plurality of messages from said first message handling unit to a second microprocessor controlled message handling unit; and transmitting said first plurality of messages from said second message handling unit to said second plurality of low-speed terminals.

The above and other objects, features and advantages of the present invention will be better understood from the following detailed description taken in conjunction with the accompanying drawings, in which:

DESCRIPTION OF THE PREFERRED EMBODIMENT

Figure 1:
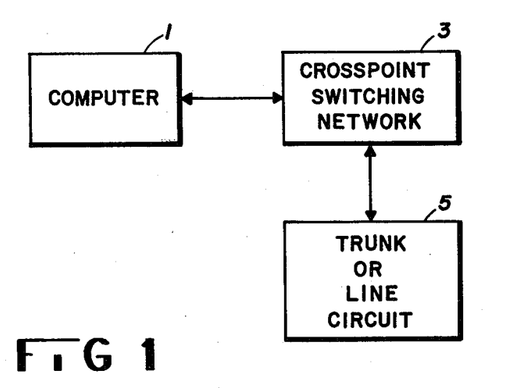
FIG. 1 is a block diagram of a prior art message handling system.

FIG. 1 is a block diagram of a message handling system according to the prior art. As can be seen, a computer 1 is coupled for communication with a crosspoint switching network 3 which in turn is coupled to the trunk on line circuits.

Figure 2A:
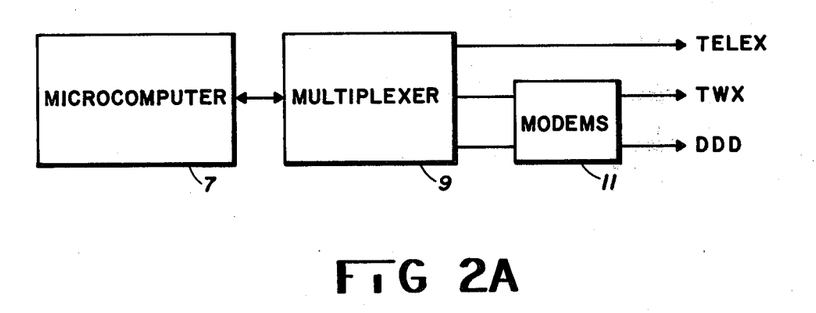
FIG. 2A is a simplified block diagram of the inventive message handler (MH) unit.

FIG. 2A is a simplified block diagram of the inventive message handling system. A microprocessor 7 communicates with multiplexers 9. The outputs of microprocessor 9 are coupled to the TWX and DDD circuits via modems 11 and to the telex circuits directly.

Figure 2B:
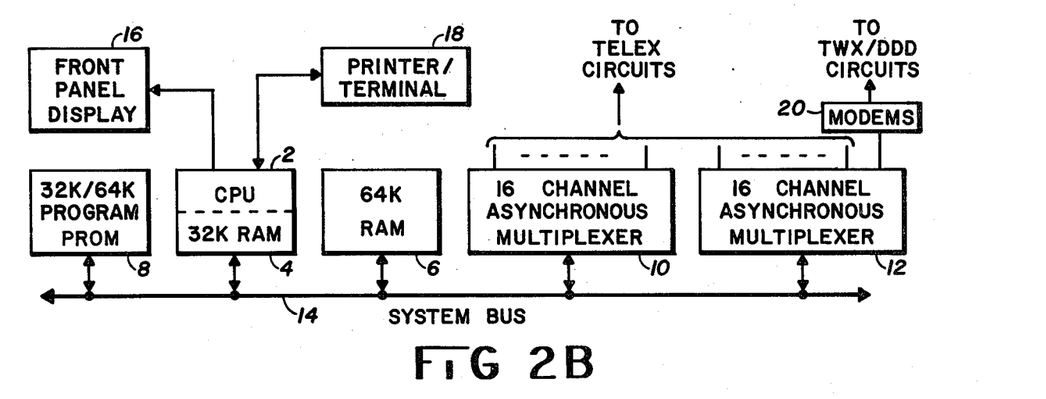
FIG. 2B is a more detailed block diagram of the inventive MH unit.

FIG. 2B is a more detailed block diagram of the system shown in FIG. 2A. The unit includes a central processing unit 2, random-access memory (RAM) 4, RAM 6, a program programmable read-only-memory 8, and first and second multi-channel (e.g. 16 channel) asynchronous multiplexers 10 and 12. Each of the above is coupled to a system bus 14. CPU 2 is coupled to a display panel 16 and, bidirectionally, to a console which includes a printer/terminal 18. As shown, the multiplexer outputs are coupled to the external telex circuits, and multiplexer 12 is coupled via modems 20 to the external TWX/DDD circuits.

CPU 2 and RAM 4 may comprise, for example, an Intel 8086 microprocessor, 32 kbytes of memory, 8 kbytes of EPROM, one serial communication port and three 8-bit parallel ports. The system software is resident in PROM 8, (e.g. an Intel SBC-0464) and messages are buffered in RAM 6 (e.g. a Motorola MCM 8064). Communications between CPU 2 and the telex, TWX and DDD lines is accomplished by means of 32 asynchronous serial output channels from multiplexers 10 and 12.

Message handlers at principal network locations will also be equipped with on-line disk systems for message buffering, program storage and look-up tables for domestic telex/TWX numbers. The disk systems may be of the Winchester type manufactured by Shugart. An additional disk drive may be provided for back-up purposes.

Modems 20 interface directly with the telephone lines and are equipped with automatic answering/dialling capability. For 1200 Baud dial-up lines, a Prentice Corp. type P212 A modem may be used, and a P103 J modem, also available from Prentice Corp., may be used for the 110/300 Baud lines.

Console 18 provides for entry of system parameters and logging of journal data. Console 18 may be a terminal of the type manufactured by Texas Instruments and bearing model number 820. Further, a 600 Baud paper tape punch and reader may be included for the purpose of providing a dump position for any messages that the system has been unable to deliver. It will also serve as the "save" dump which will be more fully described below. The reader portion of the 600 Baud punch/reader is the input device used to read tapes produced by the "save" command back into the message handler system.

A satellite based message handler unit is substantially identical with the exception that the full 32 channel capacity may not be required. In light traffic environments, a 16 channel unit may suffice, in which case the unit will have 16 channels of asynchronous multiplexing.

A message handler located at an overseas site will be referred to as a remote message handler unit. Only the input/output need be configured differently due to the differences in characteristics between U.S. based telex/TWX networks and overseas networks that operate through different computer switches.

For the sake of completeness, the asynchronous multiplexers may be of the type manufactured by Syscom and bearing part number 2103, and display 16 may be of the type manufactured by DECO and bearing part number DE245.

The inventive message handler system would be useful in a variety of communication systems, but its preferred application is as a message concentrator.

Figure 3A:
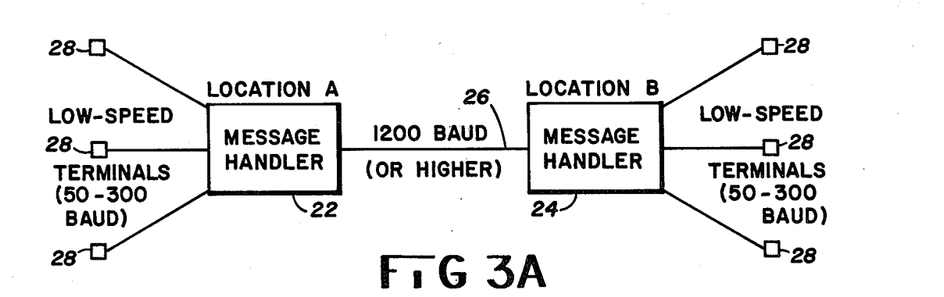
FIG. 3A is a block diagram illustrating use of the MH, shown in FIG. 2B as a concentrator.

Referring to FIG. 3A, two message handlers 22 and 24 at two distant locations A and B are connected by means of a 1200 Baud (or higher speed) line 26. At each location, the message handler (MH) is responsible for collecting and distributing messages from/to low-speed subscribers 28. This is a typical concentrator application. The 1200 Baud transmission facility 26 can be dedicated (leased), but in most cases a dial-up line is more economical. The subscriber may access the MH from Telex, TWX or DDD terminals, at any speed between 50 and 1200 Baud.

Figure 3B:
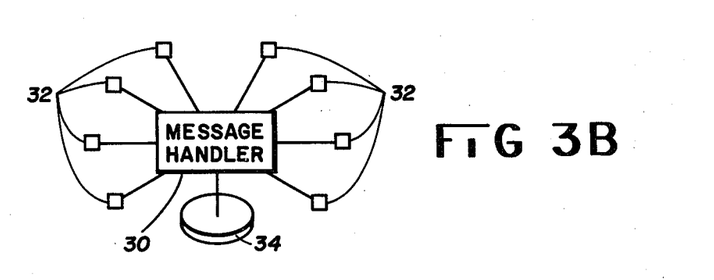
FIG. 3B is a block diagram illustrating use of the MH as a message switch.

The MH can also function as a low-speed message switch, as is shown in FIG. 3B, by means of a different set of operating programs. The MH 30 in FIG. 3B may be coupled to a plurality of subscribers 32 which represent a mixture of line types (i.e. TWX, telex, DDD, 1200 Baud, etc.). Each may be programmable to accomodate various line types. A disk storage unit is provided for message accountability.

The basic architecture of a suitable MH network assumes dial-up connections between all nodes in the network. The location of the primary node (or hub) depends on the concentration of the customer base and on the economics of message transmission. Two possibilities exist for types of service; international message traffic and domestic message traffic.

Figure 4:
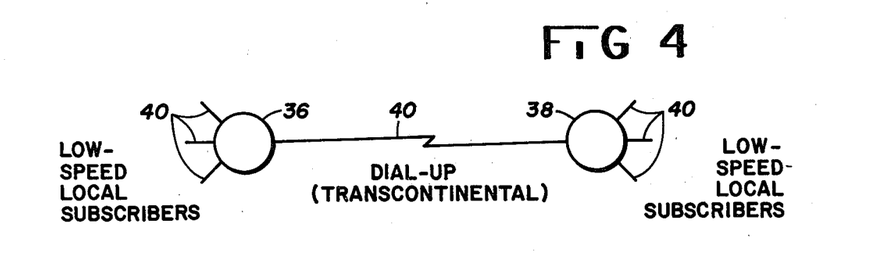
FIG. 4 illustrates use of the inventive MH in a two-node network.
Figure 5:
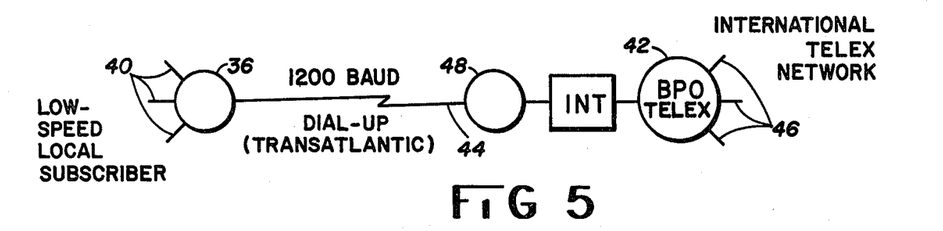
FIG. 5 illustrates use of the inventive MH in an overseas two-node network.

For usage entirely within the U.S.A., domestic service will involve the use of direct-distance-dialling (DDD) for the 1200 Baud communication. For international service, several possibilities exist depending on the country involved at the intermediate distribution point. FIG. 4 and FIG. 5 illustrate two typical cases. In FIG. 4, two nodes 36 and 38 communicate with each other over 1200 Baud facilities 40. Within their own geographic areas, nodes 36 and 38 collect and distribute messages to local subscribers over low-speed (50–300 Baud) facilities 40.

Figure 6:
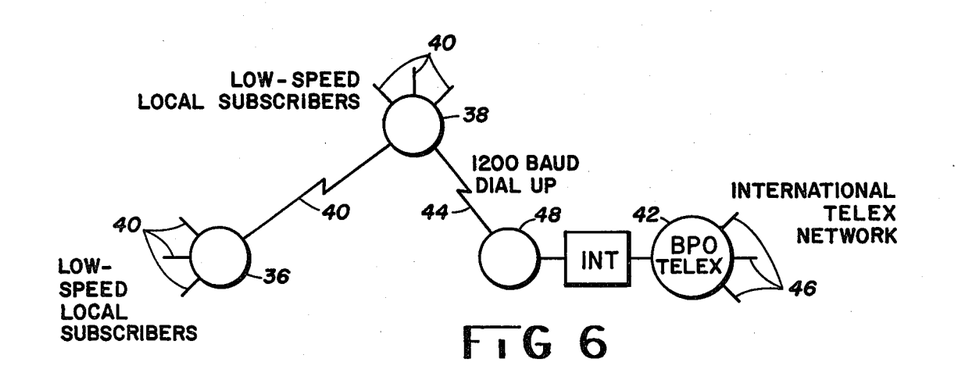
FIG. 6 illustrates use of the inventive MH in an international network.

In FIG. 5, one of the nodes (e.g. 38) is located at an overseas point. If the node were in London, then it would interface with the British Post Office's telex computer 42 via 1200 Baud transatlantic facility 44 for further connection to the international telex network 46. By combining these two cases the network can be extended to cover the continental U.S.A. as well as the international telex community. This is illustrated in FIG. 6 where like elements are denoted with like reference numerals.

Figure 7:
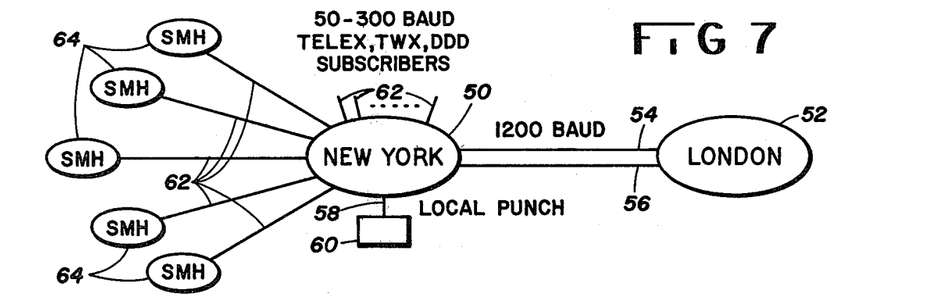
FIG. 7 is a block diagram illustrating a network configuration utilizing the inventive MH of FIG. 2B.

To illustrate the operation of the system, FIG. 7 illustrates a network whose two principal nodes 50 and 52 are in the U.S.A. and Europe respectively. For example, New York and London could be the two nodes that transmit 1200 baud traffic for distribution through the British Post Office's telex network and through the U.S. telex network for reverse traffic.

The message handler units in New York will have line capacities of 32 serial asynchronous channels. Two of the serial ports 54 and 56 will face London; one serial port 58 supports a tape punch/reader 60 that serves as a dump for "undelivered" messages and the remaining 29 serial ports 62 face domestic telex, TWX, and DDD channels in the U.S. Other nodes 64 in the U.S. may access the international telex network through the New York unit. For these transmissions, the other nodes behave like "satellites" to the principal node in New York. In the descriptions that follow, the abbreviations NYMH and LMH will be used to indicate the New York and London units, respectively, and SMH will denote a satellite message handler.

Up to 29 lines can be used to receive traffic from domestic sites for forwarding to the London drop where messages are sent to final destinations. Four types of customer inputs are handled.

| SERVICE | BAUD | CODE | SIGNALLING | DIALLING |
| --- | --- | --- | --- | --- |
| TELEX | 50 | Baudot | EIA RS232C | 60/40 Pulses |
| TWX | 110 | ASCII | Modem | Rotary |
| DDD | 110/300 | ASCII | Modem | Rotary |
| IDDD | 1200 | ASCII | Modem | Rotary |

Each port in the message handler is programmable from the console for the appropriate type of line. A typical mix of ports for the domestic inputs would be 4 TWX ports (110 Baud), 4 DDD ports (300 Baud or 110 Baud), 2 high-speed ports (1200 Baud) and 22 Telex ports (50 Baud). DDD lines are programmable for speed (50-300 Baud) and code (ASCII or Baudot).

All programmed lines are scanned continuously for an incoming call indication. When an incoming call attempt is detected, the MH responds to complete the call connection. As soon as the incoming call is connected the MH triggers the answerback of the calling machine. Three attempts are made to trigger the answerback. If it cannot be triggered, the call is knocked down. After an answerback is received, it is checked against a restricted answerback list that is maintained in the MH. This list holds the answerbacks of users who are to be denied access. If the answerback is found on the list, the call is knocked down after the transmission of the message SERVICE RESTRICTED, PLEASE CONTACT YOUR LOCAL SALES REP. Otherwise, a header and reference number is printed on the calling subscriber's terminal and traffic is accepted. The format for sending a message is depicted below:

| | | | |
| --- | --- | --- | --- |
| <TELEX Number> + | <expected answerback> (The answerback specification is optional.) | (CR) | (LF) |
| <Text> | | | |
| <End of Message> | | | |

The message input is terminated in one of the following ways:

1. NNNN

This terminates the message but does not terminate the call. Another message must follow immediately on the same connection.

2. . . . . .

A succession of five periods terminates a call and ends the connection. The MH first sends an acceptance notice and confirms the reference number. It then knocks down the call.

3. ; ; ; ; ;

A succession of five semicolons terminates the call and ends the connection. Before any further action is taken, however, the MH waits for the input line to become idel. This feature is used for paper tape input to allow the trailer to finish before sending any return traffic. Action then continues as described in (2) above.

4. (WRU)

The who-are-your character terminates a message and ends the connection. If there is traffic on the line following the (WRU), this is an error condition and (WRU) is ignored. Otherwise, action proceeds as described in (2) above.

5. No Traffic

If no traffic is received on an input line for 30 seconds, the call is terminated.

Any message in progress is discarded. The MH first sends a message to the user indicating that a knockdown follows due to lack of traffic, and then it knocks down the call.

6. Disconnect

If a connection is lost during message reception, the message in progress is discarded. If any messages preceded the message in progress on the same call, they will be accepted.

There are many error messages that are transmitted to subscribers in the event of problems encountered with message acceptance. These problems may arise out of poor connections between the subscriber and the message handler or system problems in the MH or facilities beyond the MH.

1. If a subscriber has been placed on the RESTRICTED ACCESS list, the following message will be transmitted to the subscriber upon answerback identification at the beginning of a call attempt:
SERVICE RESTRICTED, PLEASE CONTACT YOUR LOCAL SALES REP 2. If the MH detects an error in the address of a message from a subscriber, the following message will be transmitted from the handler:
ERROR DETECTED WHILE RECEIVING ADDRESS.

3. If the MH detects a line transition on its receive leg of a channel during a transmission towards a subscriber, the transmission will stop and the following message will be transmitted to the subscriber:
BAD LINE DETECTED, WILL RESEND MESSAGE.

4. If a subscriber initiates a call and at any time during the call pauses in excess of 30 seconds, the following message will be transmitted:
NO INPUT FOR 30 SECONDS 5. If more than 26 messages are sent to the MH on one connection, the following message will be transmitted to the subscriber:
MAXIMUM OF 26 FILES, RESEND EXCESS FILES. ACCEPTED NYK1xxxxxA to Z.

6. If the MH buffers are approaching full and are in need of relief, the following message is sent to a connected subscriber prior to knocking down the call:
UNABLE TO ACCPET REST OF MESSAGES. PLEASE TRY AGAIN IN 15 MINUTES.

ACCEPTED—(reference#)A to ? (depending on number of messages prior to the message being knocked down).

Message data between one node and another stays in the same format as the customer telex input, but the protocol is different as the communication is now between two computers. A processor-to-processor protocol (PTP) is used with an error correction/detection scheme.

In all methods of message input, messages are journalled at the MH system console as they are received. Included in the journalling is the reference number, time, source, and status. The status indicates REJECTED or ACCEPTED messages.

Considering our example nodes of New York and London, messages are forwarded over one or two 1200 baud dial-up lines. The dial connection is initiated and maintained by either the NYMH or the LMH.

External modems are used for the dial-up channels in the MH. The 1200 baud ports are for the purpose of transmission and reception of data from handler to handler and have a processor-to-processor protocol with an error detection and correction scheme.

For traffic originating in Europe that is collected by the London node, a similar process is used to send the messages to the New York node. Messages are received at the MYMH over the same line(s) on which domestic messages are sent to London. The two lines between the NYMH and the LMH are monitored for incoming calls. When a connection is made, a half duplex processor-to-processor protocol is used to receive traffic from the LMH. This is the same protocol mentioned in NYMH to LMH message transmission. In fact, message traffic can be bidirectional during any connection although a half duplex protocol is used. Messages are received into the LMH from the local punch/reader in the format below:

```
ZCZC                                   (CR)   (LF)
<Destination number>   <expected A/B>  (CR)   (LF)
                       (optional)
<ledger number>
<text>
NNNN
```

When a message is correctly received, the message class is determined by the destination number. Telex, TWX, and DDD service class inputs are allowed. In addition, the NYMH determines if the destination is in the New York dialling zone. If it is not, the message is forwarded to a SMH for more economical handling. When the proper destination is realized, the message is sent as soon as a port becomes available.

When a port becomes available, the dialling is done as required by the service type. If a connection cannot be made (busy or no answer), the dialling will be retried up to three times. If none of these attempts succeeds, the message will be requeued to be retried later. If any message cannot be sent with ½ hour of receipt from the LMH, a message will be printed on the control printer and the undelivered message is sent to the paper-tape dump. The ½ hour allowable message holding time can be altered from the control console to be any period of time from 1 minute to 24 hours.

After a connection is made, the user's answerback is triggered by sending a (WRU) character. If the answerback cannot be triggered, an answerback fault is reported. This answerback is checked against the expected answerback contained in the message header. If they do not match, the answerback will be retriggered and checked up to two more times. If the answerback still does not match, the call is knocked down and redialled. The call will be redialled once before cancellation. If verification fails on the second connection, the message is cancelled. A message is printed on the command console and the undelivered message is dumped to the paper-tape punch unit.

If a good connection is made and answerback validation succeeds, the message is transmitted. During transmission, the return leg of the circuit is monitored for traffic. If any line transitions are detected, a bad line is assumed, the call is knocked down, and the message is requeued. Otherwise, the answerback is again triggered at the end of the message. The call is then knocked down, delivery is reported to the NYMH command console and the message is deleted from memory.

The command station is a Texas Instrument Model 820 KSR hard copy ASCII terminal operating at 1200 baud. This station is used for the following purposes.

Console reports are generated to allow operations personnel to keep track of system operation and message status. These reports consist of printouts that identify reference numbers, ACCEPT/REJECT status, buffer status, and miscellaneous diagnostic reports. Typical examples of console reports are described in the following.

1. Every message being serviced by an MH is provided with the following header.

```
NYKxxxxxx(A)    xx    xxx    xx    xx:xx
:     :    :    :     :      :     :  : Minutes
:     :    :    :     :      :     Hours
:     :    :    day   month  year
:     :    :
:     :    alpha character indicates the first
:     :    message of a customer connection.
:     :
:     5-digit ledger number
:
Location of handler and unit number (4 characters)
```

2. When a message is received, a note is printed on the command console which describes the message status and pertinent information as follows:

```
Time  <Reference #>  <source A/B>    <destination TLX #>
                                     accepted on
                                     (port #)
                            or
Time  <Reference #>  <source A/B>    rejected
                                     on (port #)
```

Example:
18:20 SVL100022A SYSCOM SNTA 352034 accepted on line 2

3. When the mesage is delivered or declared undeliverable, a second message is printed as follows:

```
Time   <reference #>   delivered on line (port #)
                       or
Time   <reference #>   undeliverable on line
                       (port #) . . . bad answerback.
                       or
Time   <reference #>   not delivered . . . because of bad
                       lines or no answer. etc.
                       or
Time   <reference #>   Undeliverable: Held too long
                       or
Time   <Reference #>   <source A/B > <destination TLX #>
```

-continued forwarded

Example:
17:23 SVL100015A undeliverable on line 2 ... bad answerback

System configuration commands can be entered from the command console to control system operation. Items which are under such control include:
1. Invalid and valid answerback list.
2. Allowable time that messages are to remain in storage prior to notice of non-delivery.
3. Message Handler 'phone numbers.
4. Programming of line types for MH ports.
5. System "Hold" to allow the system to be emptied of traffic by delivering the existing messages in storage.
6. Save command to allow the programmed line information, answerback lists, etc to be saved on paper tape.
7. Load command to read in the tape generated by the save command.

When the on-line diagnostics uncovers serious system problems, they will be immediately reported on the console. Less serious errors will be merely remembered and can be printed on command. The front panel of the message handler units are provided with an alphanumeric display that indicates port activity and system status. There is a 32 character field for the 32 channels in the MH, and a 7 character field for system status or time-of-day. The 7 character field will display the following:

| | |
|---|---|
| HRS:MIN | |
| and, | |
| if in the following state, | |
| alternately, | |
| FULL | ... buffers nearly full |
| or | |
| FAULT | ... system fault |
| or | |
| EMPTY | ... buffers are empty |
| or | |
| ON HOLD | ... system being emptied of messages |

Each of the positions in the 32 character field will display one of the following:

| | |
|---|---|
| <blank field> | ... channel idle |
| I | ... channel in use for input |
| O | ... channel in use for output |
| F | ... channel in full-duplex mode |
| D | ... channel output in dial state |
| E | ... error, invalid state on lines |
| L | ... channel in loopback |
| H | ... channel in handshake mode on high speed line |
| W | ... channel waiting for connection. |

Figure 8:
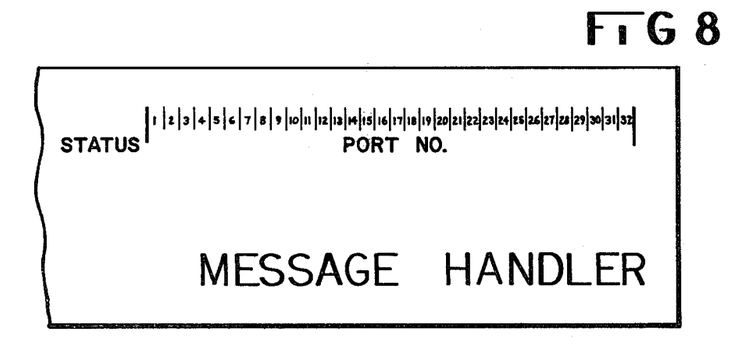
FIG. 8 illustrates the MH front panel.

The format of the front panel for the message handler is shown in FIG. 8.

The message handlers at principal nodes can handle traffic loads in excess of 5000 minutes per day (based on 400 chars/min telex traffic). Customary message sending practices are such that the bulk of the traffic gets sent during the last 4 hour period during any work day. Estimates of port requirements can be made on the worst-case assumption of 100% of the traffic being passed during these 4 hours. Based on these assumptions, the number of input message handler ports required to handle various traffic loads is given in Table 1.

TABLE 1

| TRAFFIC IN MINUTES/DAY (50 BAUD TELEX) | TRAFFIC IN MINUTES/HR (BASED ON 4 HR PERIOD) | NO. OF INPUT PORTS REQUIRED |
|---|---|---|
| 5000 | 1250 | 21 |
| 10000 | 2500 | 42 |
| 20000 | 5000 | 83 |
| 30000 | 7500 | 125 |
| 60000 | 15000 | 250 |

Similarly, the output port capacity can be estimated for different output baud rates. The above described baud rate between principal nodes of 1200 baud may be increased to 2400 baud or more. Table 2 below gives cumulative traffic handling capacities at different baud rates. For the traffic speed of 1200 Baud, each message handler can handle up to about 8640 minutes per day. The assumption again is that telex traffic is at 50 Baud (400 characters per minute).

TABLE 2

| TOTAL DAILY TRAFFIC MINS MILLIONS/ CHARS | | | | MESSAGE HANDLING CAPACITY (Millions of Chars./Hour) NUMBER OF OUTPUT PORTS | | | |
|---|---|---|---|---|---|---|---|
| PER DAY | PER DAY | PER HOUR | BAUD RATE | 1 | 2 | 3 | 4 |
| 5000 | 2.0 | 0.5 | 1200 | .432 | .864 | 1.728 | 3.456 |
| 10000 | 4.0 | 1.0 | 2400 | .864 | 1.728 | 3.456 | 6.912 |
| 20000 | 8.0 | 2.0 | 4800 | 1.728 | 3.456 | 6.912 | 13.824 |
| 30000 | 12.0 | 3.0 | 9600 | 3.456 | 6.912 | 13.824 | 27.648 |
| 60000 | 24.0 | 6.0 | | | | | |

All message handler software is based around a real-time, multitasking executive. This executive, hereafter called the 'nucleus', schedules task execution, allocates resources and facilitates inter-task communication. A brief description of some of the major software tasks is given below.

There is a TELEX input task for every telex line programmed in the system. A task will receive messages from the TELEX network, apply a ledger number, journal the message, and forward the message to remote message handler output tasks.

There is a TELEX output task for every telex line programmed in the system. Each task waits for a message to be received from the remote message handler input task when the input line is idle. It will then dial the specified number, send the message, and report delivery to the journal task. Then the message is deleted from memory.

The DDD input task performs the equivalent function for DDD as the Telex input task does for Telex lines.

The DDD output taks performs the equivalent function for DDD as the Telex Output task does for Telex lines.

The High-speed Input Task receives and transmits data on a half-duplex line from a remote message handler. Lines must be monitored for connection and, when verified, an error correcting, block oriented protocol is used to guarantee high reliability in the link. After a message is received, it is classified to be put into either the TELEX/TWX, DDD or satellite message handler queues for output handling. If there is no connection and traffic is to be sent, the task must initiate a connection by dialling up the remote message handler unit.

This taks evaluates the buffer capacity and traffic flow to determine the number of connections required to a remote message handler. Either 0, 1 or 2 connections may be required. The proper number of connections are then used for the input and output tasks in their decision to initiate, maintain, or knock-down calls. This task also determines if the traffic buffers are nearing capacity. If so, input tasks will stop accepting traffic.

The memory file system subroutine package is used by all I/O tasks to save and retrieve data transmissions. Input tasks use the OPEN, WRITE, and CLOSE commands to save the received messages in memory. A pointer to the message is then put in a queue and processed by the applicable output task. File system commands used by the output tasks are the OPEN, READ, and DELETE commands.

The command console task handles all human interaction with the message handler. Commands are recived and processed from the command console which allow the operation and configuration of the system to be controlled. Since the console is also used for message journalling, some scheme of resource allocation is required as described below.

This journal task receives messages from all I/O tasks as transmissions are received and sent. These contain time and status of messages as they enter the system and the method and time of disposition. Normally, the console is allocated to the journal task. If a space key is hit, however, journal messages will be saved in memory and the console is assigned to the command console task. This reassignment remains until a 10 second pause is detected on the command input.

The system clock task maintains a clock in memory for use by I/O tasks in journalling messages. Accurate timing is maintained using the nucleus's timed wait function. The clock keeps track of the year, month, date, and day as well as the hours, minutes, and seconds.

The display driver task maintains the front panel display. Communication from the other tasks is through a common block of memory which holds a memory image of the display. A separate tasks is needed because of the slow bandwidth of the display.

This task performs diagnostics on the message handler system. The task is at the lowest priority so it will not degrade system performance, but will use all unallocated processor time to do miscellaneous checks on the state of the machine. Any errors detected will be reported on the system console and, occasionally, on the front panel display.

The console responds to several different commands that can be used to monitor or modify the operation of the system. Each of these commands is described below.

The command console has two functions: processing commands typed by the user, and printing journal messages. When the console is performing one of these tasks, it cannot perform the other.

The console indicates that it is ready to accept a command line by printing a ">" character. The user may then enter a line of input terminated by a carriage return, which is then processed. A RUBOUT key may be used to delete last character typed; all deleted entries are echoed and surrounded by braces "{" and "}" to set them off from entries not deleted.

Control/X deletes the entire line. Control/R causes the entire line to be retyped.

While the user is typing commands, journal messages generated by other tasks in the system may be waiting to be printed. The command console will start printing these messages if the user does not type any keys for 10 seconds. This may happen even if the user is in the middle of typing a line, in which case the line is ignored. Journal messages are printed on the console prefixed with the time of day in hours and minutes.
Example:
20:15 LDN100007A received on line 15.

Once the command console has started to print journal messages, it will not accept any commands. To regain the attention of the command console, a SPACE may be typed. The command console will prompt for a command with a ">" character after it has finished printing the current journal message, if any.

The following descriptions of the commands use a non-formal structure for the purposes of simplicity. Examples are presented for clarity wherever necessary. Many of the words in the command language can be abbreviated.
For example, the command
   LINE 1/5=LOOPBACK,50,BAUDOT
may be abbreviated to read
   LI 1/5=LOOP,50, BAUD.

The CLOCK command prints the current time and date, which are set by the TIME and DATE commands, and updated every second.
Example:
   MON 26 DEC 79 20:47:23.
The format of the TIME command is as follows:
   TIME=hour:minute:second
The TIME command is used to set the current time to a new value.
Example: TIME=12:45
This will set the internal clock to 12:45 and display these numbers on the front panel of the message handler.
The format of the DATE command is as follows:
   DATE=day, date, month, year
The DATE command is used to set the current date to a new value. Any of the fields of the command are optional, and they may be separated by spaces or commas.

"DATE" may be abbreviated to "D". The day and month may also be abbreviated or spelled out completely. For example, "A" "AUG", and "AUGUST" are all equivalent (but "F" will be interpreted as "FEBRUARY", not "FRIDAY", because the command processor checks that a word is a month before it checks that it is a day).
The format of the LINE command is as follows:
   LINE [range]
   or
   LINE [range]=type, baud, character-set
Where:
   range=decimal-number [/decimal-number]
   type=one of the following: UNUSED, TLX, TWX, DDD, LEASED, TAPE, SAVE, ARCHIVE, OVERSEAS
   baud=decimal-number
   character-set=ASCII or BAUDOT
This command is used to display or change the current configuration of the 32 serial lines in the system. The optional range specifies which lines are to be referred to. If the second number of the range is omitted, it is set equal to the first number. If the range is omitted entirely, the range is set to all lines.

To display the configuration of a range of serial lines, the command "LINE" may be used, possibly followed by a range. The command console will print the type, baud, and character set currently assigned to each specified line. If a line is not being used, the command console will print only "UNUSED" for that line.

To change the configuration for a line or set of lines, the following command may be used:

LINE 10/16=TWX,110,ASCII

This command would cause lines 10 through 16 to be changed to handle TWX messages containing ASCII characters, and would set the speed for each line at 110 Baud. The speed and character set may be omitted; reasonable values will be substituted for them. The character set may be specified, but will be ignored in many cases (e.g. TLX messages are always in BAUDOT).

Line changes may not be immediately effective. For example, if line 12 happened to be processing a TLX message when the above command was issued, it would have to wait until the message was completely processed and the line was idle before the line could be changed to type TWX. The command console does not permit more than one line change to be pending on a given line.

When a line is no longer to be used, its type should be set to UNUSED. When the message handler is powered up, all lines are set to this type.

Other examples of line types are explained below for illustration.

A TAPE line is connected to a Baudot reader/punch unit for dumping of undeliverable messages. In the New York installation, the reader is not normally used, but in London, the reader is used to input messages destined for New York.

A SAVE line is similar to TAPE, except that it is used to save and restore system status on paper tape. A separate line category is required for this purpose so that the message handler will not attempt to intermix messages and system status on tape.

An ARCHIVE line type is used for use with the tape cartridge system. All messages entering the MH destined for London are automatically dumped to this megnetic tape unit as a back-up precaution. As tape cartridges are filled up, they will be unloaded by the tape unit. As the tape unit has two drives, messages can always be archived as long as at least one drive is loaded. If neither drive is loaded, with tape for 75 seconds, messages will not be archived until fresh tape is loaded. ARCHIVE lines may be added as needed.

The Answerback command is used to indicate to the MH system a search or change in answerback recognition. The change can be an addition of a new answerback to either the Valid or Invalid lists, the deletion of an answerback or the search of a specified answerback. The format of the command can be one of the following:

ADD, DELETE, SEARCH followed by a string, and then followed by the option requested, which may be VALID or INVALID.
Where:
string is a sequence of characters enclosed in single or double quotes.

These commands are used to add a string to, delete a string from, or search for a string in either the invalid or valid answerback list, or to display the answerback lists. If the particular list is not specified in the ADD, DELETE, or SEARCH commands, the invalid answerback list is assumed.

The ADD command adds a string to an answerback list. If the string is already in the list, or the list is full, an error message is printed; otherwise the new answerback is converted to upper case and added to the end of the list.

The DELETE commands deletes an existing answerback from a list. If the string is not found in the list, an error message is printed.

The SEARCH command does not alter an answerback list: it merely searches a list for the specified answerback, and prints "FOUND" or "NOT FOUND" on the console.

The INVALID command displays the contents of the invalid answerback list, and the VALID command displays the valid answerback list. The listing may be aborted by striking any key on the console.

The STATISTIC commands display or modify the contents of the system diagnostic counters. There are two sets of counters in the message handler. The first is a set of 256 counters used to log errors or diagnostic events of a general nature. The second set of counters is associated with the serial lines. There are ten such counters for each line. These are used for diagnostics and statistics that are related to specific lines.

Diagnostic counters are used by the system to count the number of occurrences of a particular error or event. These counters are incremented by one for each occurrence of the associated event.

The first form of a STATISTIC command is used to display or change the values of the general-nature diagnostic counters. There are 256 such counters, numbered from 0 to 255. If a value is specified, all the counters in the range are set to that value. For example, the command

STAT 45/78=0 would reset all general counters from 45 through 78 to zero. If the value is not specified, all counters in the range that are not zero will be printed on the console. The printing can be aborted by striking any key.

The second form of a STATISTIC command is used to display or change the line-type diagnostic counters. The first range in the command specifies a range of serial lines, while the second range specifies the range of diagnostic counters for these lines that are to be displayed or changed. These counters are numbered from 0 to 9. For example, the command

STAT LINE 8/13,4/7 displays the contents of counters 4 through 7 for serial lines 8 through 13. If the second range had been omitted, all counters for those lines would have been printed. If both ranges had been omitted, all serial line diagnostic counters would have been printed.

The PHONE command is used to display or change the phone numbers of the message handler itself and the overseas message handler. Initially the phone numbers are undefined, but the message handler needs the numbers in order to communicate with the overseas message handler. Therefore, these commands should be used to set the phone numbers before any serial lines are set up to TWX, TLX, OVERSEAS, etc.

When changing a phone number, the number may be typed with interspersed non-digit characters. These characters are removed from the number, and do not appear when the phone number is displayed. For example, the command

PHONE LOCAL=(408) 736-7320 will inform the message handler of its own phone number, and when the number is displayed with the following command:

PHONE LOCAL the number will be printed as follows:

4087367320

The command PHONE REMOTE=8143227 would be used to set a telephone number for the overseas message handler, while the command

PHONE REMOTE would merely display that number.

A UNIT command is used to display or modify the name of the message handler. The unit name identifies the unit, and is part of the journal information for messages passing through the system. The unit name must be an identifier; that is, it must consist of a letter, optionally followed by up to 3 letters or digits. A typical unit name would be "NYK4", which might be assigned to the fourth message handler in New York. The MH units are programmed for unit names of "????" at system power-up.

A REFERENCE command is used to display or change the current reference number. This number is part of the journal information for messages passing through the system, and is incremented with each new message. The reference number lies between 0 and 65535. If a larger number is entered, it is forced to lie within this range (the range of positive 16-bit integers) by a modulo 65536 operation. Initially the ledger number is 0.

A MODE command is used to display or change the current input mode. The input mode is CLEAR if no input messages are to be accepted by the message handler. This mode is useful when the message handler becomes too heavily loaded. The normal mode of operation is RUN, in which input messages are allowed. This is the initial mode of the system.

A HOLD command is used to display or modify the maximum amount of time a message may stay in the message handler before it is dumped to paper tape. A message may need to be dumped when it cannot be delivered, because of an incorrect answerback, a busy line, etc. The initial hold time is set to 30 minutes, but may be as large as 23 hours, 59 minutes. Messages that must be dumped are sent to any punch connected to a line whose type is DUMP. The LINE command (described above) is used to set up a DUMP LINE.

SAVE AND LOAD commands are used to save and restore the state of the system using paper tape. These operations should only be necessary if the system is ever powered down. To use the commands, one and only one serial line must have been assigned the type SAVE, using the LINE command. The paper tape device is assumed to be a BAUDOT punch/reader connected to this serial line.

The SAVE command saves the status of the system on tape. The information on tape includes the following:

The unit name (as set with the UNIT command).
The current reference number (as set with the REFERENCE command).
The phone numbers (as set with the PHONE commands).
The invalid and valid answerback tables.
The line configuration: type, speed, character set.

The LOAD command restores the state of the system from a tape previously punched with the SAVE command. Before LOADing can proceed, the system should be in a quiescent state; that is, all lines should be unused, except for the line assigned to the tape punch/reader (type SAVE). Once the tape is loaded and checked for errors, the line configuration will be set according to the information on the tape. All lines will be changed, including the one that was just used to read the tape.

The above description is given by way of example only. Changes in form and details may be made by one skilled in the art without departing from the scope of the invention as defined by the appended claims.

What is claimed is:

1. A microprocessor controlled message handling system for use in a dial-up environment and for transmitting messages to and receiving messages from existing telex, TWX and DDD terminals, comprising:
   a system bus;
   first memory means coupled to said bus for storing system operating programs;
   second memory means coupled to said bus for storing said messages;
   multichannel multiplexing means coupled between said bus and said telex terminals, said multichannel multiplexing means including a first plurality of low-speed input ports and a second plurality of high speed output ports;
   modulator-demodulator means coupled between said multiplexing means and said TWX and DDD terminals; and
   microprocessor means for providing on said bus write memory and read memory command signals and a signal representation of a memory location of said memory and multiplexing means connected to said bus to cause said memory location to respectively store a signal on data lines of said bus and to cause said memory location to provide a signal on said data lines.

2. A system according to claim 1 further comprising:
   a display panel coupled to said microprocessor means that provides a visual display of messages that pass through said multiplexing means; and
   a terminal bidirectionally coupled to said microprocessor means operable to provide a printed record representative of signals provided on said bus.

3. A system according to claim 2 wherein said first memory means is a programmable read-only memory.

4. A system according to claim 3 wherein said second memory means is a random access memory.

5. A system according to claim 4 wherein said multiplexing means includes 32 channels.

6. A system according to claim 5 wherein said multiplexing means includes 30 low-speed input ports and two high-speed output ports.

7. A system according to claim 5 wherein said multiplexing means includes 16 channels.

8. A system according to claim 5 wherein said modulator-demodulator means includes automatic answering and dialling apparatus.

9. A system according to claim 8 wherein said command console includes means for entering system parameters and for logging message data.

10. A system according to claim 9 wherein said third memory means is a printer for dumping data including undelivered messages.

11. A system according to claim 10 wherein said second memory means includes a disk storage system for message buffering.

12. A dial-up communication system for transmitting and receiving messages over telex, TWX and DDD lines, comprising:
   dial-up means;
   first and second message handling units;
   a communication line coupling said first and second message handling units together; and
   a plurality of low-speed communication terminals coupled to each of said message handling units via said dial-up means for communication therewith, each of said message handling units comprising:
   a system bus
   first memory means coupled to said bus for storing system operating programs;
   second memory means coupled to said bus for storing said messages;
   multichannel multiplexing means coupled between said bus and said telex terminals;
   modulator-demodulator means coupled between said multiplexing means and said TWX and DDD terminals; and
   microprocessor means for providing on said bus write and read memory command signals and a signal representation of a memory location of means connected to said bus to cause said memory location to respectively store a signal on data lines of said bus and to cause said memory location to provide a signal on said data lines.

13. A system according to claim 12 wherein each of said message handling units further comprises:
   a display panel coupled to said microprocessor means that provides a visual display of messages that pass through said multiplexing means; and
   a terminal bidirectionally coupled to said microprocessor means operable to provide a printed record representative of signals provided on said bus.

14. A system according to claim 13 wherein said multi-channel multiplexing means includes a first plurality of low-speed input ports and a second plurality of high-speed output ports.

15. A system according to claim 14 wherein said first memory means is a programmable read-only memory.

16. A system according to claim 15 wherein said second memory means is a random access memory.

17. A system according to claim 16 wherein said multiplexing means includes 32 channels.

18. A system according to claim 17 wherein said multiplexing means includes 30 low-speed input ports and two high-speed output ports.

19. A system according to claim 17 wherein said multiplexing means includes 16 channels.

20. A system according to claim 17 wherein said modulator-demodulator means includes automatic answering and dialling apparatus.

21. A system according to claim 20 wherein said command console includes means for entering system parameters and for logging message data.

22. A system according to claim 21 wherein said third memory means is a printer for dumping data including undelivered messages.

* * * * *